United States Patent
Sakamoto et al.

(10) Patent No.: US 7,553,365 B2
(45) Date of Patent: Jun. 30, 2009

(54) WATER-BASED PIGMENT DISPERSIONS, INKJET RECORDING INKS, AND COLOR FILTERS

(75) Inventors: Shigeru Sakamoto, Tokyo (JP); Yoshimasa Tsuchiya, Tokyo (JP); Masanori Takakamo, Tokyo (JP); Tohru Hosoda, Tokyo (JP); Akio Yoshida, Tokyo (JP); Michiei Nakamura, Tokyo (JP); Naoyuki Sakai, Tokyo (JP); Dai Watanabe, Tokyo (JP); Hideyuki Koiso, Tokyo (JP); Kenji Ogawa, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 902 days.

(21) Appl. No.: 11/041,293

(22) Filed: Jan. 25, 2005

(65) Prior Publication Data

US 2005/0164101 A1    Jul. 28, 2005

(30) Foreign Application Priority Data

Jan. 26, 2004 (JP) ............... 2004-017443
Jan. 27, 2004 (JP) ............... 2004-018437

(51) Int. Cl.
*C09B 67/04* (2006.01)
*C09D 7/14* (2006.01)
*B02C 17/00* (2006.01)

(52) U.S. Cl. .............. 106/499; 106/401; 106/413; 106/447; 106/460; 106/476; 106/493; 106/496; 106/497; 106/498; 241/15; 241/16; 241/29

(58) Field of Classification Search ......... 106/31.6, 106/413, 493, 499, 401, 447, 460, 476, 496, 106/497, 498; 353/84; 430/7; 241/15, 16, 241/29

See application file for complete search history.

(56) References Cited

U.S. PATENT DOCUMENTS

| | | | |
|---|---|---|---|
| 5,500,331 A | 3/1996 | Czekai et al. | |
| 5,969,002 A | 10/1999 | Kijlstra et al. | |
| 6,166,105 A | 12/2000 | Santilli et al. | |
| 6,174,361 B1 | 1/2001 | Urban et al. | |
| 6,210,474 B1 * | 4/2001 | Romano et al. | 106/31.6 |
| 6,514,644 B2 * | 2/2003 | Yamagata et al. | 430/7 |
| 6,558,460 B1 | 5/2003 | Walker et al. | |
| 6,776,830 B2 * | 8/2004 | Marritt | 106/31.68 |
| 6,786,965 B2 * | 9/2004 | Perry et al. | 106/491 |
| 6,896,724 B2 * | 5/2005 | Sun et al. | 106/31.86 |
| 2004/0251329 A1 | 12/2004 | Hsu et al. | |
| 2005/0090599 A1 * | 4/2005 | Spinelli | 524/543 |

FOREIGN PATENT DOCUMENTS

| | | |
|---|---|---|
| EP | 0 878 517 | 11/1998 |
| EP | 1146094 A2 * | 10/2001 |
| EP | 1 270 680 | 1/2003 |
| GB | 2 051 108 | 1/1981 |
| JP | 11-033377 | 2/1999 |

OTHER PUBLICATIONS

Machine Translation of Japanese Patent Specification No. JP11-033377A (Feb. 1999).*
P. Donnelly, et al., "A Comparison of Zirconia Ceramic Grinding Media", Powder and Bulk Engineering, vol. 6, 1994, pp. 1-5, XP-002329645.
P. Mueller, "Wet Grinding Process for Inkjet Inks", Powder and Bulk Engineering, vol. 3, No. 120, 2001, pp. 1-8, XP-002329646.

* cited by examiner

*Primary Examiner*—Anthony J Green
(74) *Attorney, Agent, or Firm*—Chapman and Cutler LLP

(57) ABSTRACT

An aqueous pigment dispersion is produced by ultrafinely dispersing a pigment dispersion mixture, which has been obtained by mixing at least a pigment and a dispersant in an aqueous medium, with microbeads having diameters of not smaller than 0.02 mm but smaller than 0.2 mm. A color composition for a color filter is produced by dispersing a mixture of a pigment, a dispersant, a resin varnish and a solvent with the microbeads in a mill.

3 Claims, No Drawings

WATER-BASED PIGMENT DISPERSIONS, INKJET RECORDING INKS, AND COLOR FILTERS

TECHNICAL FIELD

This invention relates to a production process of an aqueous pigment dispersion, an aqueous pigment dispersion, an image recording process and an image recording system. More specifically, the present invention has as objects thereof the provision of a production process of an aqueous pigment dispersion in which a pigment is ultrafinely dispersed, an image recording process which, when the aqueous pigment dispersion is used as an inkjet recording ink or the like, can show excellent fine particle dispersion, ink storage stability and ink ejection stability and can form an image of a color development and gloss not available to date, and an image recording system, such as a water-based inkjet printer, with the ink mounted thereon.

This invention also relates to a production process of a color composition for a color filter useful in the manufacture of a liquid crystal color display or image pickup device, and also to a fabrication process of the color filter. More specifically, the present invention is concerned with a production process of a color composition for a color filter, said color composition being suitable for the fabrication of a color filter excellent in brightness, color purity, contrast and transparency, a color composition for a color filter, a fabrication process of a color filter, and a color filter.

BACKGROUND ART

Colorants used in inkjet recording inks are roughly divided into dyes and pigments. Compared with inkjet recording inks making use of dyes as colorants, inkjet recording inks making use of pigments as colorants are characterized in that they can provide prints with excellent fastness such as waterproofness and light fastness. Dye inks are used with dyes dissolved as colorants in ink media, while pigment inks are used in the form of pigment dispersions with pigments finely dispersed as colorants in ink media. In a production process of a pigment ink, a dispersion step is, therefore, essential to finely disperse a pigment.

Especially, inkjet recording is a printing process that ink droplets are ejected through at least one very small nozzle of several tens micrometers to record an image. It is, therefore, necessary that the ink does not clog the nozzle, the ejection stability of the ink is excellent, and the ink shows high color developing ability and gloss on a recording medium. Moreover, it is also needed that the ink retains these properties over a long period, in other words, the ink has high storage stability. The division of a pigment into fine particles is essential for providing a printer with satisfactory nozzle clogging resistance and ejection stability and also for imparting satisfactory color density and gloss to prints. To meet these properties, it is required to disperse the pigment in the form of as fine particles as possible in the ink.

Dispersion of a pigment is an operation to mill or crush the pigment, which exists as aggregates, into primary particles or into a form close to primary particles. An ordinary dispersing method of a pigment is to mill or disperse a pigment dispersion mixture, which has been obtained by mixing the pigment and a dispersant in a dispersing medium, by making combined use of a disperser such as a ball mill or sand mill and a dispersing medium. Employed as the dispersing medium are beads made of a material such as glass, iron or ceramic and having a diameter of from several millimeters to 1 mm or so.

When the bead diameter is reduced, the number of beads per unit volume increases in geometrical progression, leading to a significant increase in the number of collisions between the pigment and the beads so that the pigment can be dispersed as fine particles.

When the bead diameter becomes excessively small, however, the weight per bead becomes small so that the impact force applied to the pigment upon collision of the bead against pigment becomes far weaker. As a result, a longer time is required for the dispersion of the pigment or the dispersion of the pigment into fine particles cannot be achieved. In addition, it is impossible to separate the beads and the pigment dispersion mixture from each other in the disperser. With the foregoing in view, beads of from 0.2 mm to 1.0 mm in diameter are, therefore, used especially upon dispersing the pigment into fine particles.

A color filter useful in a liquid crystal display or the like is primarily fabricated these days by a process that makes use of a pigment dispersion, specifically by applying a color composition, i.e., a so-called color resist to a substrate by a coating process such as spin coating, an electrode position process or a transfer process to form a color film, exposing the film to light through a photomask, and developing the thus-exposed film to patternize the color film into a color pattern (pixels). In general, a color resist is prepared by dispersing a pigment in an acrylic polymer and then adding a monomer, a photopolymerization initiator and the like into the resultant pigment dispersion (which is also called "base color") to impart photosensitivity to the base color. Employed as the pigment can generally be a color filter pigment produced for color filters and having primary particle sizes of from 20 to 50 nm. The pigment, an acrylic polymer, a high-molecular dispersant and a solvent are premixed, and by a bead mill containing beads having diameters of from 0.2 mm to 1 mm, the pigment is dispersed into a base color for a color resist [Norihisa NOGUCHI: "Ink Seizo to Seisan Gijutsu (Ink Manufacture and Production Technology)", Journal of Japan Society of Colour Material, 71(1), 57-67 (1998)].

Keeping step with the recent move toward inkjet printers of higher resolution and higher printing speed, there is an increasing demand for pigment inks having still higher ejection stability, color density and gloss. It has, therefore, become necessary to further reduce the particle size of a pigment dispersed in an ink. Described specifically, a reduction in the particle size of the pigment in the ink leads to a rise in the density of a color to be developed from the ink and also to inhibition of the scattering of light by pigment particles in the resulting ink film so that the thus-formed image can be provided with a higher gloss. With the above-described process that makes use of beads having diameters in the range of from 0.2 mm to 1.0 mm, however, it is difficult to divide a pigment further into particles finer than the current particle size. The division of a pigment into still finer particles is feasible by adopting tougher conditions for the operation of a disperser, for example, by making longer the residence time of a pigment dispersion mixture in a disperser and/or by increasing the circumferential speed of the disperser. These approaches have, however, developed one or more new problems in that the resulting dispersion is provided with considerably-reduced storability or a dispersion is available with lowered productivity.

DISCLOSURE OF THE INVENTION

In one aspect of the present invention, there are provided:

(1) A production process of an aqueous pigment dispersion, which comprises a step of ultrafinely dispersing a pigment dispersion mixture, which has been obtained by mixing at least a pigment and a dispersant in an aqueous medium, with microbeads having diameters of not smaller than 0.02 mm but smaller than 0.2 mm.

(2) A production process as described above under (1), which further comprises another step of finely dispersing the pigment dispersion mixture beforehand with beads having diameters of from 0.5 mm to 2 mm.

(3) A production process as described above under (2), wherein the pigment dispersion mixture is dispersed beforehand such that the pigment is formed into fine particles having an average particle size of from 100 to 500 nm.

(4) A production process as described above under (1), wherein the pigment dispersion mixture is ultrafinely dispersed in an annular mill.

(5) A production process as described above under (4), wherein the ultrafine dispersion is conducted to satisfy the following inequality (1):

$$0.005 < L/X < 0.01 \quad (1)$$

wherein L is an effective mill capacity in liters of the annular mill and X is a flow rate in liters of the pigment dispersion mixture per hour through the annular mill.

(6) An aqueous pigment dispersion obtained by a production process as described above under (1).

(7) An aqueous pigment dispersion as described above under (6), further comprising at least one additive selected from the group consisting of film-forming polymers, crosslinking agents, film-forming aids, pH adjusters, surfactants, nozzle drying inhibitors, thickeners, defoaming agents, preservatives, antimolds and antibiotics.

(8) An aqueous pigment dispersion as described above under (7), which is an inkjet recording ink.

(9) A recording process of an image, which comprises performing the recording of the image with an aqueous pigment dispersion as described above under (6).

(10) An image record obtained by a recording process as described above under (9).

(11) An image recording system comprising, as a recording material mounted thereon, an aqueous pigment dispersion as described above under (6).

(12) An image recording system as described above under (11), which is a water-based inkjet printer.

Described more specifically, the present inventors have proceeded with extensive research to develop, for the division of a pigment into finer particles, a dispersion method that can solve the above-described problems of water-based pigment inks produced by the dispersers and can provide water-based pigment inks with still improved ejection stability, color density and gloss. As a result, it has been found that the above-described object can be achieved by using as a dispersing medium microbeads having diameters of not smaller than 0.02 mm but smaller than 0.2 mm, preferably by making combined use of an annular recirculation mill, more preferably by conducting the dispersion of a pigment to satisfy the following inequality (1):

$$0.005 < L/X < 0.01 \quad (1)$$

wherein L and X have the same meanings as defined above.

The expression "the flow rate of a pigment dispersion mixture" as used herein means as will be described hereinafter. A disperser is constructed of a mill, a feed pump for feeding a pigment dispersion mixture into the mill, and a receptacle for the resulting pigment dispersion mixture discharged out of the mill. The receptacle is connected to the mill via a discharge pump. The pigment dispersion mixture is fed into the mill by the feed pump, and subsequent to dispersion processing, is discharged. Its discharge rate per hour is taken as the flow rate of the resulting pigment dispersion mixture, and this flow rate is indicated by X (liters). On the other hand, L (liters) represents the effective mill capacity of the mill. It has been found that an L/X smaller than 0.005 can hardly perform the division of a pigment into fine particles as intended and also that an L/X greater than 0.01 results in a pigment dispersion, that is, an ink of lowered storability although the intended division of the pigment into fine particles is feasible.

An annular recirculation mill has two cylinders arranged concentrically as outer and inner cylinders, respectively, and an annular rotor rotatable at high speed within an annular space formed between the two cylinders. The pigment dispersion mixture is introduced through an inlet formed between the outer cylinder and a top part of the rotor, flows round from the outer side of the rotor to the inner side of the rotor in a bottom part of the annular space, and then flows upward. After flowing through the mill, the resulting pigment dispersion mixture is discharged through a rotary screen arranged in a center part. Beads which are recirculating together with the pigment dispersion mixture, on the other hand, are collected on an outer wall of the rotor under centrifugal force produced by high-speed rotation of the beads themselves, enter the rotor through slits or holes which the rotor is provided with, and ascend through the inside of the rotor. The beads are then returned into the mill through the inlet for the pigment dispersion mixture. Accordingly, the resulting pigment dispersion mixture and the microbeads can be separated from each other without any substantial contact between the microbeads and the rotary screen.

The expression "dispersion of a pigment" as used herein has been described above to mean an operation that mills or crushes the pigment, which exists as aggregates, into primary particles or into a form close to primary particles. In initial steps of dispersion of the pigment, the aggregates exist as coarse particles in the pigment dispersion mixture. When the pigment dispersion mixture introduced through the inlet of the mill or outer screen is discharged through the rotary screen, a problem arises in that the coarse particles fill the rotary screen, because the opening size of the rotary screen which serves to separate the resulting pigment dispersion mixture and the beads from each other is set smaller than the diameter of the beads employed and the pigment dispersion mixture in initial stages still contains coarse particles of sizes that fill the rotary screen.

As a result of an extensive investigation on this problem, it has been found that the problem can, be solved by conducting ultrafine dispersion of the pigment with the above-described microbeads preferably after dispersing the pigment dispersion mixture beforehand such that with beads having diameters of from 0.5 mm to 2 mm, the pigment is formed into fine particles the average particle size of which can range preferably from 100 to 500 nm. In addition, the use of the microbeads can provide the resulting pigment dispersion with far-improved storability, because the weight per bead is reduced, and upon collision between the beads and the pigment, significantly-reduced impact force is produced to avoid giving damage to the crystalline structure of the pigment particles.

The aqueous pigment dispersion according to the present invention is excellent in the fineness of particles, contains fewer coarse particles, has a narrower particle size distribution, and can be formulated into an ink having excellent color-developing property and storability.

In another aspect of the present invention, there are also provided:

(13) A production process of a color composition for a color filter, which comprises dispersing a mixture of a pigment, a dispersant, a resin varnish and a solvent with microbeads, which have diameters of not smaller than 0.02 mm but smaller than 0.2 mm, in a mill.

(14) A production process as described above under (13), wherein the mill is an annular large-flow-rate recirculation mill.

(15) A color composition for a color filter, as obtained by a production process as defined above under (13).

(16) A fabrication process of a color filter, including a step of forming a color pattern on a color filter substrate, wherein the color pattern is formed using a color composition for a color filter as described above under (13).

(17) A color filter formed by a fabrication process as described above under (16).

An inkjet recording ink, which makes use of the aqueous pigment dispersion furnished by the production process according to the first embodiment of the present invention, can show excellent fine pigment particle dispersion, storage stability and ejection stability and can form an image of a color development and gloss not available to date.

According to the second aspect of the present invention, a color composition for a color filter (CF), said color composition containing a pigment of small average particle size and having good storage stability, can be stably produced by filling microbeads in an annular large-flow-rate recirculation mill and processing a mixture of the pigment, a dispersant, a resin varnish and a solvent in the mill to disperse the pigment.

Further, the use of the color composition for CF as obtained by the above-described process can fabricate a color filter having an excellent spectral curve characteristic, high vividness, transparency, brightness, color purity and contrast, and excellent fastness such as light fastness, heat resistance, solvent resistance, chemical resistance and waterproofness.

BEST MODES FOR CARRYING OUT THE INVENTION

The first embodiment of the present invention will next be described in further detail on the basis of certain best modes for carrying out the embodiment. As the microbeads which have diameters not smaller than 0.02 mm but smaller than 0.2 mm, are used in the present invention and characterize the present invention, ceramic microbeads made of a material such as zirconia, silicon nitride or silicon carbide are suited. As the annular recirculation mill, on the other hand, either an upright or horizontal, annular recirculation mill can be used. The microbeads can be packed preferably in a range of from 80 to 100% of the effective mill volume, with a range of from 85 to 100% being particularly preferred.

No particular limitation is imposed on the pigment to be contained in the aqueous pigment dispersion according to the present invention, and conventionally-known organic pigments and inorganic pigments can be used. Illustrative are organic pigments such as azo pigments, high molecular azo pigments, azomethineazo pigments, phthalocyanine pigments, quinacridone pigments, anthraquinone pigments and dioxazine pigments; and inorganic pigments such as carbon black pigment, titanium oxide pigments, iron oxide pigments and composite oxide pigments.

The dispersant can preferably be an alkali-soluble high-molecular dispersant commonly employed for the dispersion of pigments, and is used in a form dissolved in an aqueous medium. More specific examples of the dispersant include amine salts, alkali metal salts and the like of styrene-(meth)acrylic acid copolymers, (meth)acrylic acid-alkyl (meth)acrylate copolymers, styrene-(meth) acrylic acid-alkyl (meth)acrylate copolymers, styrene-α-methylstyrene-(meth)acrylic acid-alkyl (meth)acrylate copolymers, vinylnaphthalene-(meth)acrylic acid copolymers, styrene-malic acid copolymer, maleic acid-maleic anhydride copolymer and vinylnaphthalene-maleic acid copolymer. These anionic copolymers may be copolymerized with comonomers having one or more nonionic hydrophilic groups such as polyethylene glycol mono(meth)acrylate and methoxypolyethylene glycol (meth)acrylate; and comonomers having one or more cationic groups such as dimethylaminoethyl (meth)acrylate and diethylaminoethyl (meth)acrylate. The above-described copolymers may random, graft and block copolymers. In addition, polyesters, polyurethane and the like having hydrophilic groups such as carboxyl groups or sulfonic groups are also usable. These dispersants can be used either singly or in combination.

The aqueous medium in which the pigment and the dispersant are mixed can preferably be a mixture of water and a water-soluble organic solvent. Specific examples of the water-soluble organic solvent include ethylene glycol, propylene glycol, 1,3-propanediol, butylene glycol, diethylene glycol, triethylene glycol, polyethylene glycol, glycerin; ethylene oxide adducts of glycerin; alkyl ethers of the above-described glycols (diethylene glycol monoethyl ether, triethylene glycol monoethyl ether, diethylene glycol monopropyl ether, triethylene glycol monopropyl ether, diethylene glycol monobutyl ether, triethylene glycol monobutyl ether, polyethylene glycol monopropyl ether, polyethylene glycol monobutyl ether, polyethylene glycol monostearyl ether, and the like); N-methylpyrrolidone, 1,3-dimethylimidazolinone, thiodiglycol, 2-pyrrolidone, sulfolane, dimethyl sulfoxide, diethanolamine, triethanolamine, methanol, ethanol, isopropanol, neopentyl alcohol, trimethylolpropane, and 2,2-dimethylpropanol.

The pigment dispersion mixture for use in the present invention can preferably have a pigment content of from 10 to 40 wt. %, and the dispersant can be used preferably at a ratio of from 5 to 100 parts by weight per 100 parts by weight of the pigment.

Upon producing an aqueous pigment dispersion in accordance with the present invention, it is preferred to perform the ultrafine dispersion with the microbeads after the particle size of the pigment has been reduced and controlled to a certain degree by conducting preliminary dispersion with beads of somewhat larger particle size rather than directly performing the ultrafine dispersion step with the above-described microbeads. Described specifically, it is preferred to obtain the aqueous pigment dispersion by pouring the pigment dispersion mixture, which is composed of the above-described individual components, together with the pigment and dispersant into the aqueous medium, conducting premixing such that as first-step dispersion, the pigment is dispersed with beads of from 0.5 mm to 2 mm in diameter into the form of fine particles having an average particle size of from 100 to 500 nm, and as second-step dispersion, then subjecting the resultant pigment dispersion mixture to dispersion processing for a predetermined time in an annular mill with the above-described microbeads packed therein.

An aqueous pigment dispersion such as an inkjet recording ink can then be obtained by mixing water, a water-soluble organic solvent and at least one additive, which is selected as needed from the group consisting of film-forming polymers, crosslinking agents, film-forming aids, pH adjusters, surfactants, nozzle drying inhibitors, thickeners, defoaming agents, preservatives, antimolds and antibiotics, with the aqueous pigment dispersion to adjust the concentration of the pigment and then subjecting the resultant mixture to centrifugal separation to remove coarse particles.

In addition to the above-described inkjet recording ink, the aqueous pigment dispersion according to the present invention is also suited as inks for forming images of excellent vividness, high color concentration and high definition, such as inks for writing utensils, water-based gravure inks and water-based flexographic inks; and is also useful as aqueous pigment dispersions such as water-based paints and water-based textile printing agents.

The second embodiment of the present invention will next be described in further detail on the basis of certain best modes for carrying out the embodiment. The microbeads, a dispersing medium that primarily characterizes the present invention, are beads having diameters of not smaller than 0.02 mm but smaller than 0.2 mm, preferably from 0.02 to 0.15 mm. As the material of these microbeads, aceramic such as zirconia, silicon nitride or silicon carbide is preferred. Microbeads made of glass or steel undergo severe abrasion, act as a cause of impurities in the resulting color composition for CF, and therefore, are not preferred.

As the mill for use in the present invention, on the other hand, an annular large-flow-rate recirculation mill is preferred. A variety of annular large-flow-rate recirculation mills are available on the market. In addition, commercial upright and horizontal annular mills are all usable in the present invention. The above-described microbeads are filled in a range of from 80 to 100% of the effective capacity of the mill. The particularly preferred filling rate is in a range of from 85 to 100%.

A preferred annular large-flow-rate recirculation mill is equipped with a cylindrical rotor which is rotatable at high speed within an annular space formed between two cylinders arranged concentrically as outer and inner rotors, respectively. A dispersion, which is a premixed mixture of a pigment, a dispersant, a resin varnish and a solvent, is introduced through an inlet formed between the outer cylinder and a top part of the rotor, flows round from the outer side of the rotor to the inner side of the rotor in a bottom part of the space, and flows upward. After flowing through the mill, the resulting dispersion is discharged through a screen arranged in a center part.

Beads which are recirculating together with the dispersion, on the other hand, are collected on an outer wall of the rotor under centrifugal force produced by high-speed rotation of the beads themselves, enter the rotor through slits or holes which the rotor is provided with, and ascend through the inside of the rotor. The beads are then returned into the mill through the inlet for the pigment dispersion mixture. Accordingly, the dispersion (the color composition for CF), which has been subjected to the dispersion processing within the mill, and the microbeads can be separated from each other without any substantial contact between the microbeads and the rotary screen. More preferred is a mill which is equipped with a mechanism that the screen itself rotates to avoid filling of the screen.

As a merit available from the use of the annular large-flow-rate recirculation mill, it can be mentioned that the color composition for CF, which has been subjected to dispersion processing as described above, contains fewer coarse pigment particles and has a narrower pigment particle size distribution. By fabricating a color filter with the color composition for CF as produced as mentioned above, the color filter is provided with a color pattern significantly improved in transparency and the like.

As described above, the diameter of beads to be used in the present invention is set still smaller than the diameter of beads which have been used to date. The number of beads per unit volume, therefore, increases in geometrical progression, leading to a significant increase in the number of collisions between the pigment and the beads in the premixed mixture. Different from a pigment dispersion obtained by using beads of a usual size, the pigment can be dispersed as fine particles of 100 nm or smaller so that the dispersion efficiency of the pigment increases substantially.

As another merit available from the use of microbeads of such diameters as described above in the present invention, the weight of each bead to be used becomes lighter so that impact force between the beads and the pigment upon collision becomes significantly weaker to significantly reduce a damage to be given to the crystalline structure of pigment particles. In a pigment for use in the color composition for CF, the particles of the pigment have been subjected to surface treatment with a surface treating agent. For the same reasons as described above, the state of covering of the surfaces of the pigment particles with the treatment agent is not impaired for the same reasons as described above. Accordingly, the storage stability of the resultant color composition for CF also increases significantly.

Each color composition for CF, which is produced by the above-described process, is composed of a pigment, a dispersant, a resin varnish and a solvent.

As pigment for use in the present invention, no particular limitation is imposed thereon, and an R (red) pigment, G (green) pigment, B (blue) pigment, complementary-color pigment, black pigment or the like, which has been used conventionally in color compositions for CF, can be used. It is possible to mention as illustrative red pigments, anthraquinone pigments and diketopyrrolopyrrole pigments; as illustrative green pigments, chlorinated phthalocyanine green and brominated phthalocyanine green; as an illustrative blue pigment, ε-copper phthalocyanine blue; as illustrative yellow pigments, quinophthalone pigments, isoindoline pigments and nickel-azo complex pigments; as an illustrative violet pigment, dioxazine violet pigment; and as an illustrative black pigment, carbon black. No particular limitation is imposed on the amount of the pigment to be used, but in general, the pigment can be used in a proportion of from 5 to 500 parts by weight per 100 parts by weight of the below-described resin binder in the resin varnish.

As the dispersant for use in the present invention, any one of conventionally-known pigment dispersants is usable. Preferably, however, high-molecular dispersant having cationic groups or anionic groups are used. As the solvent, any one of solvents used in conventionally-known color compositions for CF is also usable. Preferred solvents are ether or ester solvents derived from ethylene glycol or propylene glycol.

As the resin varnish for use in the present invention, no particular limitation is imposed thereon, and any one of conventionally-known resin varnishes used in color compositions for CF can be used. A medium in the resin varnish can be an organic solvent medium or an aqueous medium. Further, one or more of conventionally-known additives, for example, dispersion aids, leveling agents, bonding agents and the like can be added as needed to the resin varnish.

A resin varnish is prepared by dissolving a resin in a suitable medium, for example, an organic solvent or an aqueous medium, and is composed of the solvent and resin. As the resin varnish for use in the present invention, any one of photosensitive resin varnishes and non-photosensitive resin varnishes can be used. Illustrative photosensitive resin varnishes include photosensitive resin varnishes useful in ultraviolet ray curing inks, electron radiation curing inks and the like. Illustrative non-photosensitive resin varnishes resin varnishes useful in printing inks such as letterpress inks, lithographic inks, intaglio (gravure) inks or stencil (screen) inks, resin varnishes useful in inkjet printing, resin varnish useful in electrocoating, resin varnishes useful in developers for electroprinting or electrostatic printing, and resin varnishes useful in thermal transfer films or ribbons.

Specific examples of such photosensitive resin varnishes include varnishes of photosensitive cyclic rubber resins, photosensitive phenol resins, photosensitive polyacrylate resins, photosensitive polyamide resins, and photosensitive polyimide resins; varnishes of unsaturated polyester resins, polyester acrylate resins, polyepoxy acrylate resins, polyurethane acrylate resins, polyether acrylate resins, and polyol acrylate resins; and varnishes prepared by adding monomers as reactive diluents to the above-exemplified varnishes. As suitable resins in the above-described photosensitive resins, acrylate resins containing free carboxyl groups in the molecules, said acrylate resins being developable with an alkali, can be mentioned.

Specific examples of such non-photosensitive resin varnishes include varnishes containing cellulose acetate resins, nitrocellulose resins, styrene (co)polymers, polyvinylbutyral resins, aminoalkyd resins, polyester resins, amino-resin-modified polyester resins, polyurethane resins, acrylpolyolurethane resins, soluble polyamide resins, soluble polyimide resins, soluble polyamide-imido resins, soluble polyesterimide resins, hydroxyethylcellulose, water-soluble salts of styrene-maleate copolymers, water-soluble salts of (meth)acrylate (co)polymers, water-soluble aminoalkyd resins, water-soluble aminopolyester resins, and water-soluble polyamide resins. These varnishes can be used either singly on in combination.

The color composition for CF, which pertains to the present invention and is composed of the above-described respective components, can be produced, for example, by mixing the pigment, resin varnish, dispersant and solvent at a predetermine ratio, premixing the resultant mixture by a usual method, subjecting the thus-premixed mixture to dispersion processing in a microbead-filled, annular large-flow-rate recirculation mill to prepare a base color of a color corresponding to the pigment, adding necessary additives to the base color, and if necessary, adjusting the pigment concentration, viscosity and the like with a solvent compatible with the used resin varnish. The following is one example of a preferred mixing ratio of the pigment, resin varnish, dispersant and solvent upon conducting the premixing:

<Illustrative Mixing Ratio>

Per 20 parts by weight of the pigment, the resin varnish (solid content: 30 wt. %): 30 to 70 parts by weight, the dispersant (solid content: 50 wt. %): 5 to 20 parts by weight, and the solvent: 10 to 50 parts by weight.

A description will next be made about a fabrication process of a color film, which makes use of the color composition for CF as obtained by the above-described process of the present invention.

When a photosensitive resin varnish is used as a resin varnish, a conventionally-known photopolymerization initiator such as benzoin ether or benzophenone is added to the above-described base color so that the base color is used as a photosensitive color composition for CF. As an alternative, the base color can also be used as a thermopolymerizable color composition for CF by using a thermopolymerizable initiator in place of the above-described photopolymerizable initiator.

Using the above-described photosensitive color composition for CF, a color filter can be fabricated as will be described hereinafter. The photosensitive color composition for CF is coated over the entire surface of a transparent substrate by using, for example, a spin coater, low-speed rotation coater, roll coater, knife coater or the like. As an alternative, full-surface printing or partial printing of a size slightly greater than a pattern to be formed is performed on the transparent substrate with the photosensitive color composition for CF by desired one of various printing processes. After the thus-coated film is preliminarily dried, a photomask is brought into close contact with the dried film, and exposure is conducted by an extra-high pressure mercury vapor lamp to bake the pattern. Subsequently, development and washing are conducted, and if necessary, post-baking is performed to fabricate a color filter with the predetermined pattern formed thereon. This pattern-forming process for the color filter is known by itself, and therefore, no particular limitation is imposed on the forming process of a CF pattern in the present invention.

Using the above-described non-photosensitive color composition for CF, a color filter can be fabricated as will be described hereinafter. Firstly, the non-photosensitive color composition for CF is applied in the form of a color pattern on a transparent substrate, for example, by directing printing the color pattern on the substrate with the non-photosensitive color composition for CF by desired one of the above-described various printing processes, by forming the color pattern on the substrate by electrocoating (in which a water-based color composition for CF is used), forming the color pattern on the substrate in accordance by inkjet printing, or forming the color pattern on a transfer substrate beforehand by one of the above-described processes and then transferring the color pattern onto a CF substrate. In a manner known per se in the art, it is then possible to perform baking, to conduct grinding for the smoothening of the surface, and/or to apply a top coat for the protection of the surface as needed. In addition, a black matrix can be formed in a manner known per se in the art to obtain a color filter having desired RGB patterns. The fabrication process itself of these color filters is known in the art, and therefore, no particular limitation is imposed on the fabrication process of a color filter.

EXAMPLES

The present invention will next be described more specifically based on Examples and Comparative Examples, in which all designations of "part" or "parts" and "%" are on a weight basis unless otherwise specifically indicated.

Example 1

A high-molecular dispersant (a copolymerization product of methacrylic acid, butyl acrylate, styrene and hydroxyethyl acrylate at a weight ratio of 25 parts/50 parts/15 parts/10 parts, weight average molecular weight: 12,000; 40 parts) was poured into a mixed solution of potassium hydroxide (7 parts), water (23 parts) and triethylene glycol mono-n-butyl ether (30 parts). The thus-obtained mixture was heated under stirring at 80° C. to conduct a polymerization reaction such that a high-molecular dispersant varnish was prepared.

A red pigment, C. I. Pigment Red (hereinafter abbreviated as "PR") 122 (dimethylquinacridone pigment), (3.0 kg), ethylene glycol (1.5 kg) and water (8.1 kg) were added to the varnish (solid content: 43%, 2.4 kg), followed by stirring in a mixer to perform premixing. The resulting pigment dispersion mixture was subjected to dispersion processing by a multi-pass method in a horizontal bead mill with a multi-disk impeller. The horizontal bead mill was filled to 85% with 0.5 mm zirconia beads, and had an effective capacity of 1.5 liters. Described specifically, the dispersion was conducted by a two-pass method at a bead circumferential speed of 8 m/sec and a delivery rate of 30 liters per hour to obtain a pigment dispersion mixture having an average particle size of 325 nm. Recirculating dispersion was next conducted through a horizontal annular bead mill, which was filled to 95% with 0.05 mm zirconia beads and had an effective capacity of 1.5 liters. Using a screen the opening size of which was 0.015 mm, the pigment dispersion mixture (10 kg) was dispersed for 4 hours at a bead circumferential speed of 10 m/sec and a recirculation rate of 300 liters/hour to afford an aqueous pigment dispersion having a pigment concentration of 20%. The average particle size of the pigment in the dispersion was 96 nm.

Ethylene glycol (15 parts), glycerin (10 parts) and deionized water (50 parts) were added to the dispersion (25 parts) to adjust the pigment concentration to 5%. After thorough stirring, centrifugation separation was conducted at 12,000 rpm for 30 minutes to remove coarse particles so that an ink was obtained. The viscosity of the ink was 2.8 mPa·s (25° C.), and the average particle size of the pigment was 95 nm.

Examples 2 & 3

Inks were obtained in a similar manner as in Example 1 except that the pigments in Table 1, namely a blue pigment, C.I. Pigment Blue (hereinafter abbreviated as "PB") 15:3 and a yellow pigment, C. I. Pigment Yellow (hereinafter abbreviated as "PY") 74 were used, respectively, in place of the pigment used in Example 1.

Example 4

An ink was obtained in a similar manner as in Example 1 except that the second-stage dispersion processing was conducted for 4 hours at a recirculation rate of 200 liters/hour.

Referential Example 1

An ink was obtained in a similar manner as in Example 1 except that the second-stage dispersion processing was conducted for 4 hours at a recirculation rate of 100 liters/hour.

Referential Example 2

An ink was obtained in a similar manner as in Example 1 except that the second-stage dispersion processing was conducted for 4 hours at a recirculation rate of 500 liters/hour.

Comparative Examples 1-3

Aqueous pigment dispersions of 20% pigment concentration were obtained in a similar manner as in Examples 1-3 except that through a horizontal annular bead mill filled to 85% with 0.5 mm zirconia beads, having an effective capacity of 1.5 liters and equipped with a multi-disk impeller in place of the horizontal annular bead mill, aliquots (10 kg) of the pigment dispersion mixture were separately subjected to recirculating dispersion processing for 4 hours at a bead circumferential speed of 10 m/sec and a delivery rate of 20 liters per hour. From the aqueous pigment dispersions, inks were obtained in a similar manner as in Example 1.

Comparative Example 4

An aqueous pigment dispersion of 20% pigment concentration was obtained in a similar manner as in Example 1 except that through a horizontal annular bead mill filled to 85% with 0.5 mm zirconia beads, having an effective capacity of 1.5 liters and equipped with a multi-disk impeller in place of the horizontal annular bead mill, an aliquot (10 kg) of the pigment dispersion mixture was subjected to recirculating dispersion processing for 10 hours at a bead circumferential speed of 14 m/sec and a delivery rate of 10 liters per hour. From the aqueous pigment dispersion, an ink was obtained in a similar manner as in Example 1.

The average particle sizes of the pigments in the respective aqueous pigment dispersions obtained in Examples 1-4, Referential Examples 1 and 2 and Comparative Examples 1-4 were measured. In addition, the viscosities and average pigment particle sizes of the inks obtained form the individual dispersions were also measured both before and after they were heated at 50° C. for 7 days. The results of those measurements are shown in Table 1.

With the individual inks, solid printing was performed on exclusive glossy paper sheets by a commercial inkjet printer. The resulting solid prints were measured for optical density by a Macbeth densitometer. Moreover, those solid prints were also measured for 20-degree gloss by a glossmeter. The results of those measurements are shown in Table 2.

TABLE 1

|  | Pigment | L/X | Dispersion Particle size (nm) | Ink (before heating) Particle size (nm) | Ink (before heating) Viscosity (mPa · s) | Ink (after heating) Particle size (nm) | Ink (after heating) Viscosity (mPa · s) |
| --- | --- | --- | --- | --- | --- | --- | --- |
| Example 1 | PR122 | 0.005 | 96 | 95 | 2.8 | 96 | 2.8 |
| Example 2 | PB15:3 | 0.005 | 85 | 82 | 2.5 | 82 | 2.6 |
| Example 3 | PY74 | 0.005 | 85 | 83 | 2.3 | 87 | 2.2 |
| Example 4 | PR122 | 0.0075 | 94 | 96 | 2.7 | 96 | 2.8 |
| Ref. Ex. 1 | PR122 | 0.015 | 90 | 87 | 3.2 | 105 | 10 |
| Ref. Ex. 2 | PR122 | 0.003 | 117 | 103 | 3.2 | 106 | 3.4 |
| Comp. Ex. 1 | PR122 | 0.075 | 127 | 119 | 3.0 | 122 | 3.5 |
| Comp. Ex. 2 | PB15:3 | 0.075 | 118 | 110 | 2.6 | 111 | 2.6 |
| Comp. Ex. 3 | PY74 | 0.075 | 135 | 132 | 2.1 | 133 | 2.2 |
| Comp. Ex. 4 | PR122 | 0.15 | 94 | 94 | 3.4 | Measurement was impossible | Gelled |

TABLE 2

|  | Pigment | Average particle size (nm) | Measurement data of print OD value | 20-deg. gloss |
|---|---|---|---|---|
| Example 1 | PR122 | 95 | 2.39 | 38.2 |
| Example 2 | PB15:3 | 82 | 2.07 | 32.2 |
| Example 3 | PY74 | 83 | 2.01 | 40.1 |
| Example 4 | PR122 | 96 | 2.37 | 38.0 |
| Ref. Ex. 1 | PR122 | 87 | 2.35 | 37.7 |
| Ref. Ex. 2 | PR122 | 103 | 2.28 | 37.4 |
| Comp. Ex. 1 | PR122 | 119 | 2.08 | 34.1 |
| Comp. Ex. 2 | PB15:3 | 110 | 1.87 | 20.6 |
| Comp. Ex. 3 | PY74 | 132 | 1.77 | 28.9 |

A description will hereinafter be made about the results of the measurements. It is understood from Table 1 that the dispersions obtained by using the microbeads of 0.05 mm in diameter and operating the annular recirculation mill under the conditions of L/X=0.005 in Examples 1-3 were superior in the dispersion of fine particles than the dispersions obtained under the conventional dispersion processing conditions in Comparative Example 1-3. Further, no difference is observed in storage stability between the dispersions of Examples 1-3 and the dispersions of Comparative Examples 1-3. In Example 4, similar results as in Example 1 were obtained despite the condition of L/X=0.0075. In Referential Example 1 in which L/X was set at 0.015, the dispersion was excellent in the dispersion of fine particles but was inferior in storage stability. An ink available from such a dispersion cannot assure good storage stability over a long period because the properties of the ink tend to vary. In Referential Example 1, there is a significant difference in particle size between the dispersion and the heated ink. It is, therefore, estimated that the dispersion of Referential Example 1 had a particle size distribution containing abundant coarse particles. In Referential Example 2 in which L/X was set at 0.003, the dispersion was excellent in the dispersion of fine particles but was inferior in storage stability. In Comparative Example 4, the conventional mill and dispersing medium were used, the circumferential speed of the beads was increased, and moreover, the residence time of the pigment dispersion mixture in the mill was prolonged. The dispersion and ink obtained in Comparative Example 4 were considerably reduced in storage stability although they were excellent in the dispersion of fine particles.

From Table 2, clear correlations are observed between the particle size of a pigment dispersed in an ink and the color density and gloss of the ink. Specifically, an ink with a pigment contained in a finely-divided form is excellent in the color density of the ink and the gloss of the resulting images.

The second aspect of the present invention will next be described more specifically based on Examples and Comparative Examples, in which the designations of "part" or "parts" and "%" are on a weight basis. Further, the following abbreviations will be used: PR: C.I. Pigment Red, PY: C.Y. Pigment Yellow, PG: C.I. Pigment Green, PB: C.I. Pigment Blue, and PV: C.I. Pigment Violet.

Example 5

To an acrylic resin varnish (a copolymerization product of methacrylic acid, butyl acrylate, styrene and hydroxyethyl acrylate at a molar ratio of 25/50/15/10, weight average molecular weight: 12,000, solid content: 30%; 50 parts), a diketopyrrolopyrrole pigment (PR254, 20 parts), a high-molecular dispersant (the amine salt of a polyester acid, solid content: 50%, 12 parts) and a solvent (propylene glycol monomethyl ether acetate—hereinafter abbreviated as "PMA", 18 parts) were added. After those components were premixed, the resultant pigment dispersion mixture was subjected to dispersion processing by a recirculating operation in a horizontal annular large-flow-rate recirculation mill having an effective capacity of 1.5 liters, packed to 95% of the above-described capacity with 0.05 mm zirconia beads and equipped with an inverter-controlled motor (5.5 kw).

A screen the opening size of which was 0.015 mm was used as a screen in the mill. The pigment dispersion mixture was subjected to dispersion processing for 5 hours at a bead circumferential speed of 10 m/sec and a recirculation rate of 300 liters/hour. The cumulative power fed to the mill was 20 kwh. The thus-dispersed mixture was taken out of the mill, to which PMA was added to dilute the mixture such that the pigment content of the mixture was lowered to 15% to obtain a red base color (red color composition for CF) according to the present invention.

Using a spinner, the red base color was applied to a thickness of 1 μm on a glass substrate, followed by drying to form a color film. The color film was measured for chromaticity (Y) by a chromoscope ("CLORCOM C", trade name; manufactured by Dainichi Seika Color and Chemicals, Inc.) and also for contrast by a luminance calorimeter ("TOPCON WITH BUILT-IN TOPCON BM-7"; manufactured by TOPCON CORPORATION). Further, the average particle size of the pigment in the red base color was also measured by a particle size distribution analyzer ("FPAR-1000", trade name; manufactured by OTSUKA ELECTRONICS CO., LTD.). Moreover, the storage stability of the red base color at 40° C. was also measured in terms of viscosity (Brookfield rotational viscometer). The results of the above measurements are shown in Table 3.

Examples 6-12

In a similar manner as in Example 5 except for the use of the pigments shown in Table 3 [PR177 (Example 6), PY139 (Example 7), PG36 (Example 8), PY150 (Example 9), PB15:6 (Example 10), PV23 (Example 11) and carbon black (Example 12) in place of the pigment used in Example 5, base colors of the respective color tones were obtained. The average particles sizes of the pigments in the base colors, the storage stability of the base colors, and the chromaticity (Y) and contrast of color films formed from those base colors are shown in Table 3. With respect to the base color making use of carbon black as a pigment (for the formation of a black matrix), the OD value of a black film formed by using the base color (as measured by a Macbeth densitometer) is shown.

Comparative Examples 5-12

In a similar manner as in Examples 5-12 except for the use of a multi-pass horizontal mill with a multi-disk impeller in place of the annular large-flow-rate recirculation mill, base colors of the respective color tones were obtained. Color films were formed likewise, and were similarly measured for chromaticity, contrast and OD value. The average particles sizes of the pigments in the base colors of the respective colors were also determined. Further, the base colors were also tested for storage stability. The results are shown in Table 3. It is to be noted that as dispersion conditions for the mixtures in Comparative Examples 5-12, a dispersion chamber of 1.5 liter capacity was packed to 85% with 0.5 mm zirconia beads. As in Examples 5-12, the mill was operated at a bead circumferential speed of 10 m/sec. The dispersion was conducted by a 32-pass method. The thus-obtained color compositions of the respective colors for CF were measured as in Example 5-12. The results of the measurements are shown in Table 3.

As evident from Table 3, the base colors of Examples 5-12 and the color films formed from the base colors were lower in the initial viscosity and the viscosity after stored at 40° C. (1 month later) than the base colors and color films of Comparative Examples 5-12. The color films of Examples 5-12 were high in chromaticity (Y) and contrast. It is, therefore, understood that the base colors of Examples 5-12 have excellent properties as base colors for use in color compositions for CF.

TABLE 3

| Base color | Average particle size (nm) | Storage stability [viscosity (mPa · s) 40° C.] Initial | One month later | Chromaticity (Y) | Contrast |
|---|---|---|---|---|---|
| Example 5 PR254 | 91 | 18 | 19 | X = 0.65 Y = 20.1 | 750 |
| Example 6 PR177 | 76 | 12 | 12 | X = 0.65 Y = 14.2 | 1100 |
| Example 7 PY139 | 60 | 14 | 16 | X = 0.49 Y = 73.0 | 520 |
| Example 8 PG36 | 56 | 13 | 14 | X = 0.24 Y = 60.1 | 1200 |
| Example 9 PY150 | 107 | 21 | 22 | X = 0.42 Y = 92.1 | 710 |
| Example 10 PB15:6 | 61 | 13 | 13 | X = 0.11 Y = 13.5 | 1020 |
| Example 11 PV23 | 89 | 12 | 13 | X = 0.08 Y = 8.0 | 530 |
| Example 12 CB | 80 | 15 | 18 | OD value 3.0 | — |
| Comp. Ex. 5 PR254 | 109 | 20 | 25 | X = 0.65 Y = 19.2 | 600 |
| Comp. Ex. 6 PR177 | 81 | 12 | 14 | X = 0.65 Y = 13.6 | 900 |
| Comp. Ex. 7 PY139 | 79 | 14 | 19 | X = 0.49 Y = 71.9 | 400 |
| Comp. Ex. 8 PG36 | 71 | 14 | 15 | X = 0.24 Y = 56.3 | 950 |
| Comp. Ex. 9 PY150 | 130 | 23 | 25 | X = 0.42 Y = 90.5 | 600 |
| Comp. Ex. 10 PB15:6 | 82 | 14 | 16 | X = 0.11 Y = 12.9 | 800 |
| Comp. Ex. 11 PV23 | 136 | 14 | 19 | X = 0.08 Y = 7.6 | 400 |
| Comp. Ex. 12 CB | 112 | 16 | 20 | OD value 2.6 | — |

Example 13

To fabricate a color filter having an RGB pattern, R, G and B color compositions for CF were prepared in accordance with the formulas shown in Table 4.

TABLE 4

| Component (parts) | R | G | B |
|---|---|---|---|
| Red base color of Example 5 | 85 | — | — |
| Yellow base color of Example 7 | 15 | — | — |
| Green base color of Example 8 | — | 63 | — |
| Yellow base color of Example 9 | — | 37 | — |
| Blue base color of Example 10 | — | — | 85 |
| Violet base color of Example 11 | — | — | 15 |
| Acrylic resin varnish | 50 | 50 | 50 |
| Trimethylolpropane acrylate | 10 | 10 | 10 |
| 2-Hydroxy-2-methylpropiophenone | 2 | 2 | 2 |
| 2,2-Diethoxyacetophenone | 1 | 1 | 1 |
| Propylene glycol monomethyl ether | 37 | 37 | 37 |
| Total | 200 | 200 | 200 |

A glass substrate which had been subjected to silane coupling treatment was mounted on a spin coater, and the red color composition for CF in Table 4 was spin-coated firstly at 300 rpm for 5 seconds and then at 1,200 rpm for 5 seconds. Pre-baking was then conducted at 80° C. for 10 minutes. A photomask having a mosaic pattern was brought into close contact with the pre-baked film, and under an extra-high pressure mercury vapor lamp, exposure was performed at a light quantity of 100 mJ/cm². Development and washing were then conducted with an exclusive developer and an exclusive rinse, respectively, to form a red mosaic pattern on the glass substrate.

Subsequently, a green mosaic pattern and a blue mosaic pattern were formed with the green and blue color compositions for CF in Table 4, respectively, by conducting coating and baking in a similar manner as described above. As a result, a color filter having an RGB pattern was obtained. The color filter so obtained had excellent spectral curve characteristics and was excellent in durability such as light fastness and heat resistance and also had excellent properties in connection with the transmission of light, and showed superb properties as a color filter for liquid crystal color display.

INDUSTRIAL APPLICABILITY

An inkjet recording ink, which makes use of the aqueous pigment dispersion furnished by the production process according to the first embodiment of the present invention, can show excellent fine particle dispersion, storage stability and ejection stability and can form an image of a color development and gloss not available to date.

According to the second aspect of the present invention, a color composition for a color filter (CF), said color composition containing a pigment of small average particle size and having good storage stability, can be stably produced by filling microbeads in an annular large-flow-rate recirculation mill and processing a mixture of the pigment, a dispersant, a resin varnish and a solvent in the mill to disperse the pigment.

Further, the use of the color composition for CF as obtained by the above-described process can fabricate a color filter having an excellent spectral curve characteristic, high vividness, transparency, brightness, color purity and contrast, and excellent fastness such as light fastness, heat resistance, solvent resistance, chemical resistance and waterproofness.

The invention claimed is:
1. A production process for an aqueous pigment dispersion, which comprises (A) and (B):
(A) finely dispersing a pigment in a pigment dispersion mixture of at least said pigment and a dispersant in an aqueous medium with beads having diameters of from

0.5 mm to 2 mm such that said pigment is formed into fine particles having an average particle size of from 100 to 500 nm; and (B) ultrafinely dispersing said pigment dispersion mixture, which has been obtained in step (A), with microbeads having diameters of not smaller than 0.02 mm but smaller than 0.2 mm.

2. A production process according to claim 1, wherein said pigment dispersion mixture is ultrafinely dispersed in an annular mill.

3. A production process according to claim 2, wherein said ultrafine dispersion is conducted to satisfy the following inequality (1):

$$0.005 < L/X < 0.01 \tag{1}$$

wherein

L is an effective mill capacity in liters of said annular mill and

X is a flow rate in liters of said pigment dispersion mixture per hour through said annular mill.

* * * * *